Oct. 19, 1926.
E. A. SPERRY, JR
1,603,646
ELECTRICAL TRANSMISSION SYSTEM
Filed July 21, 1920    4 Sheets-Sheet 1
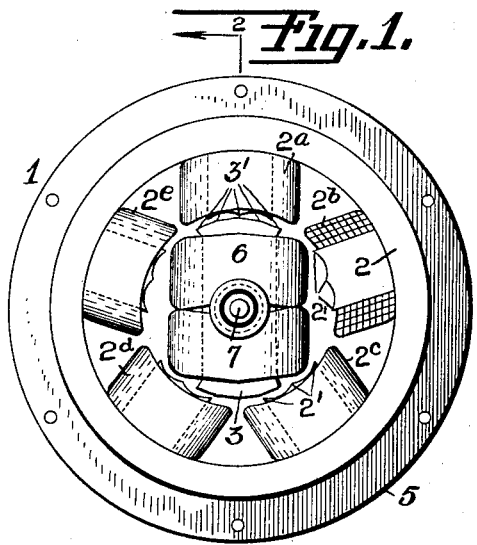
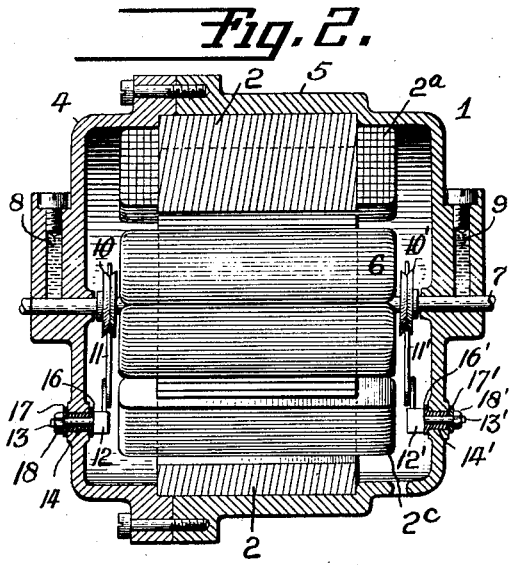
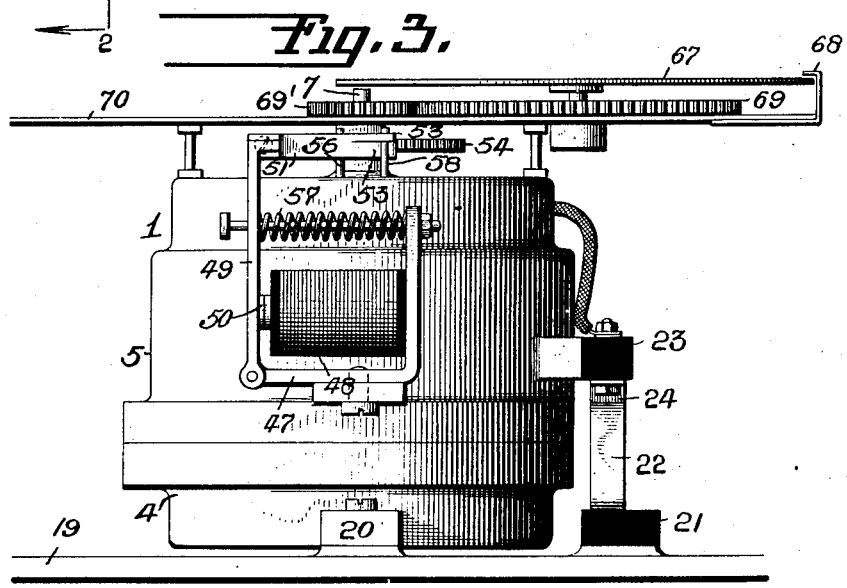
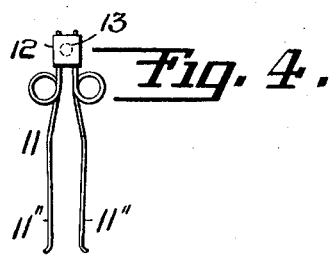
Inventor
ELMER A. SPERRY, JR.
By his Attorney
Herbert H. Thompson

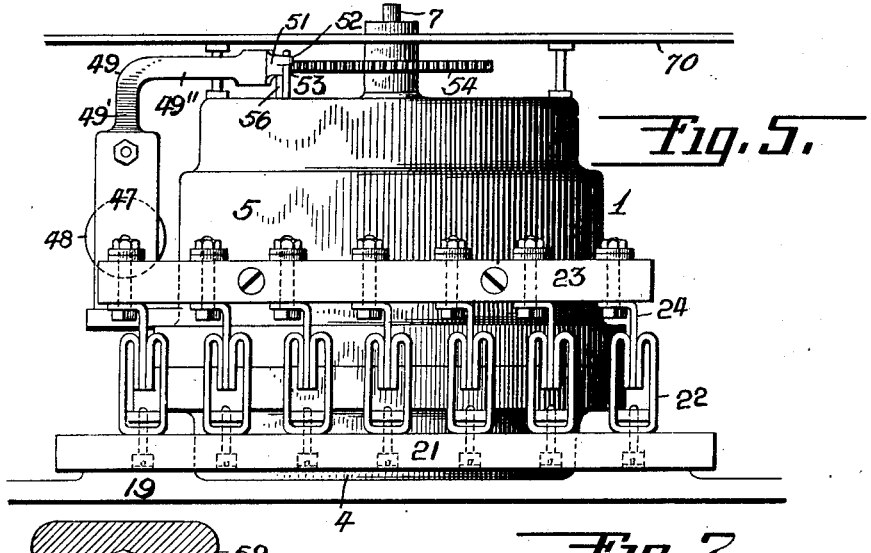
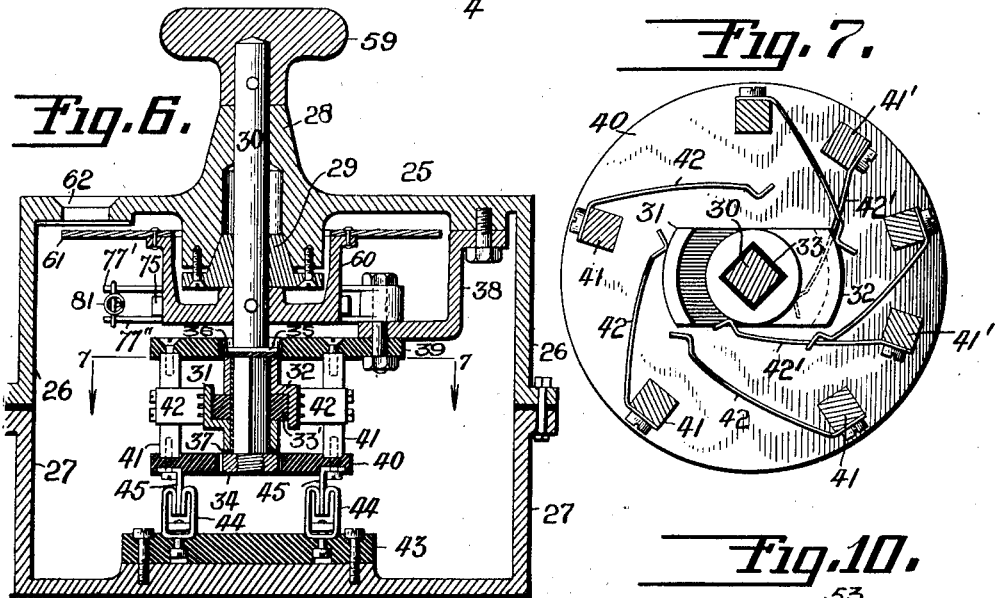
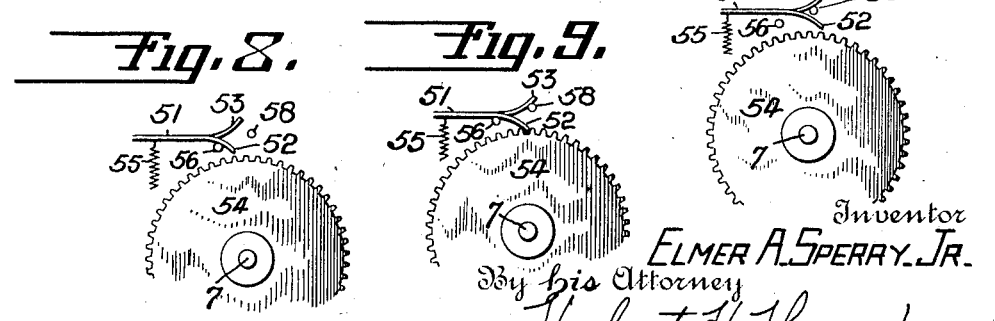
Inventor
ELMER A. SPERRY, JR.
By his Attorney
Herbert H. Thompson Oct. 19, 1926.　　　　E. A. SPERRY, JR　　　1,603,646
ELECTRICAL TRANSMISSION SYSTEM
Filed July 21, 1920　　　4 Sheets-Sheet 3

Inventor
ELMER A. SPERRY, JR
By his Attorney
Herbert H. Thompson

Oct. 19, 1926.

E. A. SPERRY, JR 1,603,646

ELECTRICAL TRANSMISSION SYSTEM

Filed July 21, 1920     4 Sheets-Sheet 4

Inventor
ELMER A. SPERRY, JR.
By his Attorney
Herbert H. Thompson

Patented Oct. 19, 1926.

1,603,646

UNITED STATES PATENT OFFICE.

ELMER A. SPERRY, JR., OF BROOKLYN, NEW YORK, ASSIGNOR TO THE SPERRY GYROSCOPE COMPANY.

ELECTRICAL TRANSMISSION SYSTEM.

Application filed July 21, 1920. Serial No. 397,968.

This invention relates to transmission systems for positioning an indicator or other device in accordance with the position of a remotely located element. One of the objects of my invention is to provide a simple and efficient transmission system comprising a transmitter and a repeater motor operable by direct current and wherein as many as twenty steps of the repeater motor per revolution of the transmitter may be obtained.

Another object is the provision of means for rendering definite each step of the repeater motor, so that the rotatable element of said motor will not occupy any one of a plurality of positions when the transmitter is turned to a given position, but will occupy a single definite position instead.

A further object of my invention is to provide means for guarding against loss of synchronism when the current is turned on, so that, if the transmitter is turned through 180 degrees relatively to the repeater motor while the current is off, synchronism between the instruments will be insured when the transmission circuit is closed.

Still another object is the provision of a practical and efficient form of repeater motor and also a simple and reliable construction of transmitter for cooperation therewith. Other objects and advantages will appear as the description of the invention proceeds.

Referring to the drawings wherein I have shown what I now consider to be the preferred forms of my invention:

Fig. 1 is a plan view, partly in section, of an improved form of repeater motor, the top section of the motor casing being removed.

Fig. 2 is a vertical section on line 2—2 of Fig. 1.

Fig. 3 is a side elevation of a motor of the type shown in Fig. 2 showing in addition certain attachments thereto.

Fig. 4 is a view of a detail.

Fig. 5 is a view in elevation at right angles to Fig. 3, certain parts in the upper portion of the latter figure being omitted.

Fig. 6 is a vertical sectional view of my improved type of transmitter.

Fig. 7 is a transverse section taken on line 7—7 of Fig. 6.

Figs. 8, 9, and 10 are detail views showing different positions of certain parts associated with the repeater motor.

Figure 11:
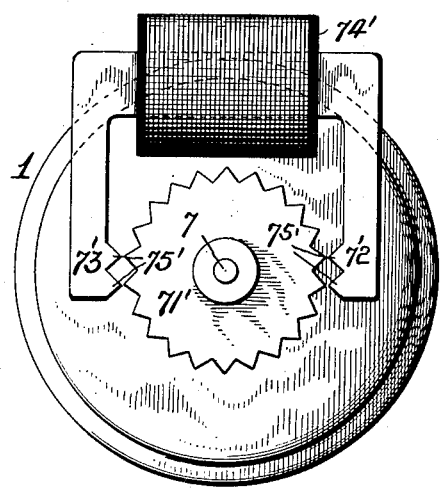

Fig. 11 is a plan view of an alternative form of means for insuring definite positions of the armature of the repeater motor.

Figure 12:
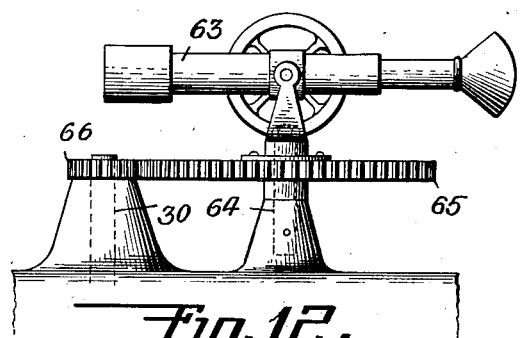

Fig. 12 is a fragmentary side elevation showing a transmitter connected with a sighting instrument for actuation thereby.

Figure 13:
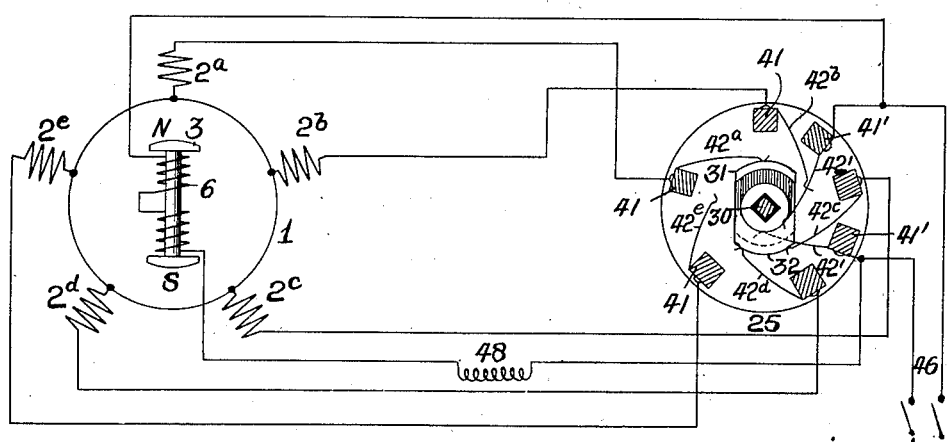

Fig. 13 is a wiring diagram.

Figure 14:
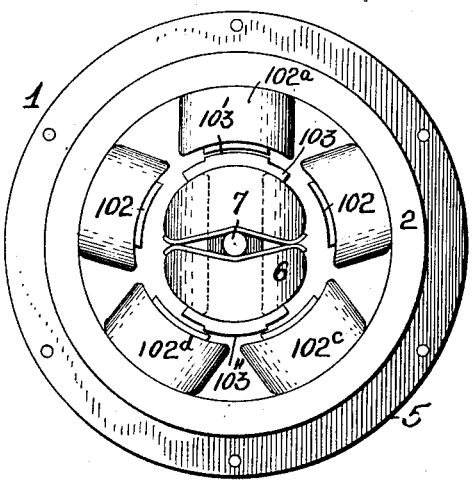

Fig. 14 is a plan view of another form of repeater motor.

Figure 15:
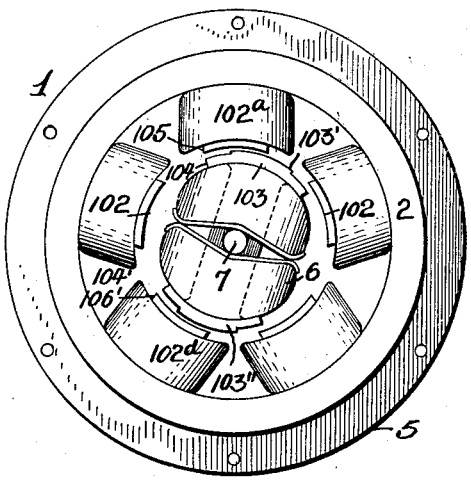

Fig. 15 is a plan view similar to Fig. 14 and showing another position of the armature of the repeater motor.

Figure 16:
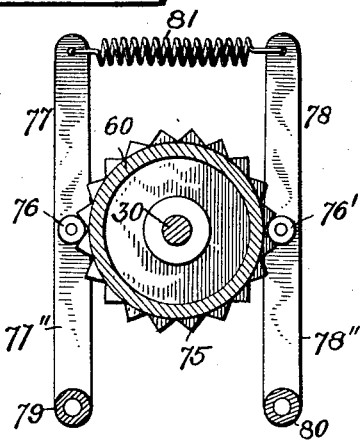

Fig. 16 is a sectional view of a detail.

Figure 17:
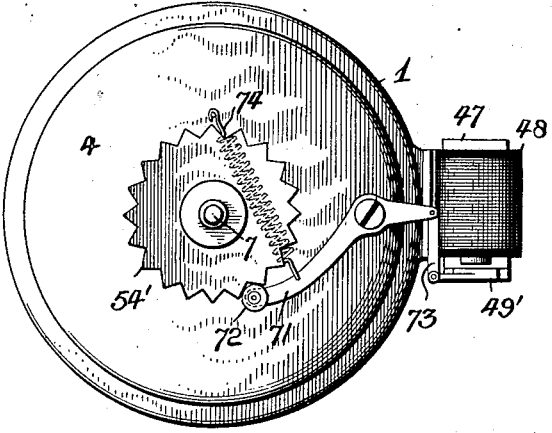

Fig. 17 is a plan view showing an alternative form of means for preventing loss of synchronism between the transmitter and repeater motor.

Figure 18:
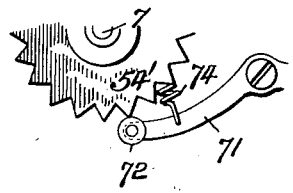

Fig. 18 is a detail view showing another position of parts shown in Fig. 17.

Figure 19:
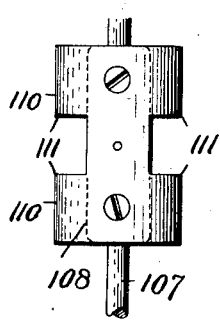

Fig. 19 is an end elevation of a modified form of repeater motor armature.

Figure 20:
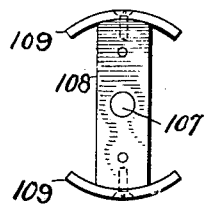

Fig. 20 is a plan view of Fig. 19.

Figure 21:
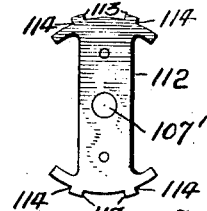

Fig. 21 is a view of still another modified form of repeater armature.

Reference numeral 1 designates a repeater motor comprising field poles 2 preferably a greater number than four and a rotatable armature 3. Said poles and armature are shown mounted in a casing consisting of sections 4 and 5 bolted or otherwise secured together in any suitable manner. The armature is provided with a winding 6 and is mounted on a shaft 7 rotatably journaled in the end portions of sections 4 and 5, respectively. If desired, oil reservoirs 8 and 9 in communication with the journal portions of shaft 7 may be provided on said end portions of the casing sections, as shown in Fig. 2 for lubricating said journal portions of the shaft. For leading current to winding 6 slip rings 10, 10' are shown on shaft 7, which rings are engaged by spring contact brushes 11, 11' similar in construction and carried by casing sections 4 and 5, respectively. The brush 11 is shown in detail in Fig. 4 as comprising a pair of spring fingers 11'', 11'' looped adjacent their base portions to provide suitable spring tension and supported by a metal block 12 carried by a bolt 13. Bolt 13 extends through the motor casing wall and is shown surrounded by an annular insulating member 14. An insulating washer 16 is interposed between block 12 and the casing, and another insulating washer 17 is shown between the casing and nut 18 on bolt 13. In this manner current may readily be led through the casing section 4 to brush 11, and in a similar manner current may be led through casing section 5 to brush 11' by means of bolt 13' and base member 12'.

In the form of repeater motor which I have shown an odd number (five) of pole pieces 2 provided with windings $2^a$, $2^b$, $2^c$, $2^d$, and $2^e$, respectively, are spaced equidistantly about the inner circumference of the motor casing and are carried thereby. The motor may be bolted or otherwise detachably secured in any suitable manner to a base plate 19, as through diametrically opposite lugs extending from the motor casing, one of which lugs is shown at 20 in Fig. 3. Base plate 19 carries a block 21 of insulating material to which are secured upwardly projecting spring contact elements 22. Mounted on one side of motor 1 is a block 23 of insulating material carrying a plurality of contact elements 24 for cooperation with contacts 22. The latter contacts are shown as each comprising a strip of metal having a base portion at one end and a pair of resilient contact fingers at the other end between which a corresponding contact blade 24 is adapted to fit snugly. I have shown seven contacts 24, two of which may be connected with brushes 11, 11' and the remainder with the windings of the stationary field poles 2 in any suitable manner. Contacts 22 likewise are seven in number and are connected with a transmitter as will be presently more fully explained. From the construction above described it will be seen that motor 1 may be readily secured to base plate 19 with contacts 24 engaging contacts 22.

In Figs. 6 and 7 I have shown one form of transmitter for use in connection with the repeater motor 1. The transmitter as a whole is designated 25 and comprises casing sections 26, 27 bolted or otherwise secured together and within which are mounted the elements for establishing various circuits through the repeater motor 1 and thus controlling the position of armature 3. Rotatably mounted in bearings 28, 29 in the top of casing section 26 is a shaft 30. The lower portion of said shaft 30 is squared, as shown more clearly in Fig. 7, and carries a pair of members 31, 32 of conducting material suitably insulated from said shaft and from each other. Each member 31, 32, comprises a hub portion fitting over an insulating sleeve 33 on the squared part of shaft 30 and a segmental arc-shaped portion extending laterally from the portion which fits over the insulating sleeve. Members 31 and 32 are shown positioned between a nut 34 threaded on to the lower end of shaft 30 and a collar 35 at the junction of the square and rounded portions of said shaft. Surrounding sleeve 33 and interposed between members 31 and 32 is a washer 33' of insulating material. An insulating washer 36 may be interposed as shown between member 32 and collar 35, while another insulating washer 37 may be placed between member 31 and nut 34.

Supported from the casing section 26, as by means of a bracket 38, is an insulating member 39, through which shaft 30 passes with suitable clearance, as shown. A second insulating member 40 is supported from member 39 through the medium of posts or standards 41 secured at their ends to said members. Said posts 41 are of conducting material and each post has secured thereto a flexible spring-contact brush 42 adapted to engage with members 31, 32 as the latter are rotated with shaft 30. As shown clearly in Fig. 7, five posts 41 and brushes 42 are provided which are spaced equidistantly about the circumference of member 40, and two other similar posts 41' having brushes 42' are mounted intermediate certain of posts 41. Brushes 42' bear continually on the outer circular peripheries of the hub portions of members 31, 32, respectively. A block 43 of insulating material is secured to the bottom of casing section 27 and carries upstanding spring contacts 44 similar to contacts 22. Each post 41 and 41' has secured thereto so as to be electrically connected therewith, a contact blade 45 adapted to cooperate with a corresponding contact 44. The contacts 45 are, as will be readily understood, circularly arranged about the bottom of member 40 and contacts 44 are positioned on member 43 in a similar manner, so that all contacts 44 may be simultaneously engaged with corresponding contacts 45. It will be seen that the transmitter parts carried by casing section 26 are thus readily detachable from those mounted on section 27. In order to avoid unnecessary complication of the drawing, only two contacts 44 and 45 and two posts 41 are shown in Fig. 6.

In Fig. 13 I have shown connections between transmitter 25 and repeater motor 1 whereby 20 steps per revolution of the armature 3 may be obtained. The field windings $2^a$, $2^b$, $2^c$, $2^d$, and $2^e$ are all connected together at one end and each of said windings is connected at its other end to a respective one of posts 41 and brushes 42. In this figure I have designated the brushes 42 as $42^a$, $42^b$, $42^c$, $42^d$, and $42^e$, according to the particular field coil to which each brush is connected. The direct current mains 46 are connected to posts 41' and brushes 42', which posts and brushes are also connected with the terminals of the armature winding 6. In this manner armature 3 is constantly polarized. By so arranging members 31, 32 and brushes 42 that as shaft 30 is turned brushes 42 are alternately bridged by twos and threes in the proper sequence I am enabled to obtain twenty steps of armature 3 per revolution. Thus when the members 31 and 32 are in the position shown in Fig. 13, so that brushes 42ª, 42ᶜ, and 42ᵈ are bridged by said members and current is caused to flow through coil 2ª in such direction as to make the latter a south pole, and through coils 2ᶜ and 2ᵈ in such direction as to make the latter north poles, armature 3 will occupy the position shown. If, now, transmitter shaft 30 is rotated in a clockwise direction a sufficient distance from its position in Fig. 13, brush 42ᶜ will no longer engage members 32, and repeater field coils 2ª and 2ᵈ alone will be energized. Armature 3 will thereupon move until the forces exerted upon it by coils 2ª and 2ᵈ are in equilibrium and will accordingly assume a position 18 degrees in a clockwise direction from its position in Fig. 13. The members 31 and 32 are so designed and brushes 42ª to 42ᵉ so positioned that by the time shaft 30 has moved through 18 degrees contact with a brush will be made or broken and the number of repeater poles energized will be changed. Thus, by the time shaft 30 has rotated clockwise through 18 degrees from its position in Fig. 13 contact with brush 42ᶜ will have been broken. On the other hand, by the time that shaft 30 has been rotated in a counter-clockwise direction through 18 degrees from its position in Fig. 13, contact with brush 42ᵈ will have been broken, and armature 3 will consequently have assumed a position 18 degrees in a counter-clockwise direction from its position in Fig. 13.

As transmitter shaft 30 is rotated through 180 degrees in a clockwise direction from its position in Fig. 13 the repeater field poles will be energized as follows: poles 2ª and 2ᵈ; poles 2ª, 2ᵇ, and 2ᵈ; poles 2ᵇ and 2ᵈ; poles 2ᵇ, 2ᵈ, and 2ᵉ; poles 2ᵇ and 2ᵉ; poles 2ᵇ, 2ᶜ, and 2ᵉ; poles 2ᶜ and 2ᵉ; poles 2ᶜ, 2ᵉ, and 2ª; poles 2ᶜ and 2ª; and poles 2ª, 2ᶜ, and 2ᵈ. With segments 31 and 32 moved through 180 degrees it will now be noted that the flow of current through poles 2ª, 2ᶜ, and 2ᵈ is reversed so that pole 2ª becomes a north pole, thereby attracting the S end of armature 3, and poles 2ᶜ and 2ᵈ become south poles and attract the N end of said armature. Continuing the rotation of shaft 30 clockwise through 180 degrees more, the poles are energized in the same order as in the first 180 degrees rotation, although the current through them is, of course, reversed. It will thus readily be seen that as transmitter shaft 30 is moved through 360 degrees, armature 3 is caused to make a complete revolution in steps of 18 degrees each. Furthermore, it will be seen that if, while the current is off, transmitter shaft 30 and segments 31, 32 be turned to any position, other than a position at an angle of 180 degrees from the position of armature 3, said armature will automatically assume the same position as shaft 30 and segments 31, 32, when the flow of current through the system is again established.

From the arrangement above disclosed it will be noted, however, that if transmitter shaft 30 be rotated through exactly 180 degrees while the current is off, armature 3 will not move when the current comes on. Thus, assume that the circuit through the system is broken when the parts are in the position shown in Fig. 13, and that shaft 30 is turned through 180 degrees. When the current comes on pole 2ª will be a north pole, and poles 2ᶜ and 2ᵈ south poles, but this will obviously cause armature 3 to remain in its position shown in Fig. 13, so that the repeater motor 1 is out of synchronism with the transmitter. In Figs. 3 and 5 I have shown one form of means for preventing such loss of synchronism by automatically imparting a slight movement to shaft 7 and armature 3 when a flow of current through the repeater is established, whereby the said armature will thereupon be acted upon by the energized repeater feed poles to assume a position in synchronism with the transmitter.

Supported on the outside of the repeater motor 1, as by means of a bracket 47 secured to the motor casing, is a solenoid or electromagnet 48. An arm 49 comprising portions 49' and 49" at right angles to each other is pivoted at one end, as shown, to the base of bracket 47 and carries an armature 50 adapted to be attracted by the solenoid 48. At its other end the arm 49 carries an arm 51 provided at one end with prongs 52, 53. Said arm 51 is positioned adjacent a toothed wheel 54 mounted on and rotatable with shaft 7. The arm 51 may furthermore be formed from resilient material or else connected with a spring 55, as shown in Figs. 8, 9, and 10, so as to be biased towards gear wheel 54 and into engagement with a pin 56 mounted on the top of the repeater motor casing. When solenoid 48 is deenergized, the pivoted arm 49 is returned to its normal position by a spring 57 bearing at its ends between arm 49 and bracket 47, as shown, and in the normal position of said arm 49, the prong 52 of arm 51 is out of engagement with the wheel 54, as shown in Fig. 8. When, now, solenoid 48 is energized, pivoted arm 49 is attracted and arm 51 moved so that prong 52 engages toothed wheel 54 (see Fig. 9) and rotates the latter. As movement of the pivoted arm 49 towards solenoid 48 continues, however, prong 53 engages a stationary pin 58 mounted on the top of the motor casing. Prong 53 is shown provided with a curved surface which cooperates with pin 58 so that further motion of arms 49 and 51 causes prong 52 to be withdrawn from engagement with wheel 54.

The arm 51 and associated parts then occupy the position shown in Fig. 10. Solenoid 48 may be connected in series with the winding of armature 6, as shown in Fig. 13. Consequently at the instant when a flow of current is established through the repeater armature, said solenoid is energized and thereupon wheel 54 and armature 3 are turned slightly. Said armature is thereupon caused by the field poles of the repeater then energized to come to rest in a position in synchronism with the transmitter.

An alternative form of means for preventing loss of synchronism between the repeater motor and transmitter is shown in Figs. 17 and 18. An arm 71 is pivoted intermediate its ends on the casing of motor 1 and carries at one end a roller 72 adapted to cooperate with the teeth of wheel 54' on armature shaft 7. The other end of arm 71 is connected by a link 73 with arm 49', which is adapted to be attracted by the electromagnet 48. A spring 74, connected at one end with the motor casing and at its other with arm 71, serves to bias said arm towards wheel 54'. Wheel 54' is shown provided with twenty teeth so positioned with respect to roller 72 that, when current is flowing through the motor and solenoid 48 is energized to retract arm 71 from wheel 54', one of the points of said wheel lies adjacent roller 72, as shown in Fig. 18, so that on movement of arm 71 towards wheel 54' roller 72 will engage the side of said tooth and move said wheel through one-half step. Hence, for each step of the repeater motor armature, a tooth of wheel 54' is moved opposite and adjacent to roller 72. If, now, the circuit through the motor and magnet 48 be broken, spring 74 will draw arm 71 towards wheel 54' and roller 72 will hence move said wheel, together with shaft 7 and the repeater armature, until the roller 72 occupies a position between adjacent teeth of wheel 54'. The amount of movement imparted to wheel 54' and shaft 7 by arm 71 and roller 72 thus is equivalent to one-half step of the repeater armature. Upon the reestablishment of current through the repeater motor, solenoid 48 is again energized and roller 72 is withdrawn from engagement between the teeth of wheel 54'. The repeater armature and shaft 7 are then moved, by the poles of the repeater motor which are energized, into position corresponding with the transmitter. It will be seen that arm 71 and roller 72 are held by magnet 48 from interfering with the action of the repeater motor 1 when the current is on. It will be seen further that, by causing armature shaft 7 to be automatically moved through one-half step when the circuit through the repeater motor is broken, loss of synchronism between said motor and the transmitter will be avoided if means be provided for insuring that movement of the transmitter shaft be by complete steps, since the transmitter shaft cannot then be turned to a position 180 degrees away from the position of shaft 7 and the repeater motor.

In order to prevent the transmitter shaft, when turned, from being turned less than one step at a time, I have shown, in Figs. 6 and 16, an annular series of teeth 75 provided on the outside of a member 60 secured to the shaft 30. The member 60 serves also to carry dial 61 visible through an aperture 62 in the top of the transmitter casing for indicating the angular position of shaft 30. Cooperating with teeth 75, as shown in Fig. 16, are diametrically opposite rollers or other suitable projections 76, 76' carried by members 77, 78, respectively, which arms may be pivoted at one end each to the base of bracket 38. Each member 77, 78 comprises a pair of parallel arms between which roller 76 or 76' is mounted, said arms being connected at one end by a hub member 79 or 80, respectively, by which said arms are pivoted. In Fig. 6 the arms of member 77 are designated 77' and 77'', respectively. Between the free ends of members 77 and 78 is connected a spring 81 which serves to draw said members towards each other and rollers 76, 76' into engagement with diametrically opposite spaces between teeth 75. Twenty spaces between said teeth are shown, corresponding with twenty steps of the transmitter. It will thus readily be seen that, as transmitter shaft 30 is turned, rollers 76 and 76' will cooperate with teeth 75 to insure that said shaft is moved with a definite step-by-step movement, and that turning of said shaft through less than one step at a time will be prevented. Now, since shaft 30 can be moved only step-by-step, and since repeater shaft 7 is moved one-half step when the current flow ceases, movement of the transmitter shaft through 180 degrees with relation to the position of the repeater armature is prevented and loss of synchronism between the transmitter and repeater obviated.

It is found in practice that when armature 3 moves through a given step it may occupy any one of a plurality of slightly different angular positions in which the action of the repeater poles upon the armature is substantially the same. One means which I have provided for insuring that the armature 3 will assume only one position for each step is shown in Fig. 1, wherein the pole pieces 2 are provided on their faces with projections 2', and armature 3 is likewise provided with projections 3'. These projections serve as points for concentrating the magnetic flux and cooperate to prevent armature 3 from assuming more than one definite position for each step, since for each step of armature 3 the projections on the armature assume a definite position with respect to the cooperating field poles.

In Fig. 11 I have shown an alternative form of means for insuring definite positions of the repeater armature. In this figure armature shaft 7 has mounted thereon a toothed wheel 71' which is rotatable between the poles 72', 73' of an electromagnet 74'. Said poles are provided with projections 75'. Magnet 74' is continuously energized during the operation of the repeater motor. Projections 75' serve to concentrate the magnetic flux and, in cooperation with the teeth of wheel 71', cause the repeater armature to occupy only one position for each step thereof.

A further alternative form of means for insuring definite positions of the repeater armature is illustrated in Figs. 14 and 15. In these figures, the pole pieces 102 have smooth faces. The faces of the pole pieces are of equal size and are slightly wider than the spaces between adjacent pole pieces. Armature 103 is shown provided with curved central projections 103', 103" at the faces or ends of said armature, said projections being of the same width as the pole pieces as shown in Fig. 14. By making armature projections 103', 103" of the same width as the pole pieces, a definite position of armature 103 is insured when three poles are energized as shown in Fig. 14, since armature 103 moves so that projection 103' comes exactly opposite pole piece 102$^a$ in which the maximum magnetic flux from pole piece 102$^a$ passes through said projection and the ends or shoulders of said projection tend to remain in line with the ends of the pole piece 102$^a$. At the same time it should be noted that the projection 103" bridges the gap between poles 102$^c$ and 102$^d$ and that the end or shoulder portions of said projection 103" extend slightly in front of said poles, so that flux from the poles 102$^c$ and 102$^d$ passes through said end portions of said projection 103". By means of projections 103' and 103", in cooperation with the flux from poles 102$^a$, 102$^c$, and 102$^d$, armature 103 is brought into the position shown in Fig. 14 and occupies said position as long as said poles are energized.

Fig. 15 shows the position of armature 103 with poles 102$^a$ and 102$^d$ energized, which position is 18 degrees in a clockwise direction from the position of said armature in Fig. 14. The faces of armature 103 are of such extent that when one tip or end shoulder portion of said armature comes opposite the tip of a pole piece, a tip or end shoulder portion of the other face of the armature lies opposite a tip of another pole piece. Thus, in Fig. 15, tip or shoulder 104 of armature 103 lies opposite tip 105 of pole 102$^a$ and tip or shoulder 104' of said armature lies opposite tip 106 of pole piece 102$^d$.

When poles 102$^a$ and 102$^d$ are energized, armature 103 immediately assumes the position shown in Fig. 15 and as long as said poles are energized any change in the position of armature 103 from the one shown will result in a change in the magnetic flux therethrough and the return of said armature into its position shown. Since the poles 102 are energized alternately by twos and threes, as previously described, it will be evident that the action of the armature 103 for different positions thereof will be similar to that described with reference either to Fig. 14 or Fig. 15.

Figs. 19 and 20 show another type of armature which may be employed. To the end faces of armature core 108 which is shown mounted on shaft 107 are secured pieces 109 of magnetic metal. Each metal strip 109 may comprise upper and lower portions 110 of greater width than the armature core and an intermediate portion of less width than portions 110, as shown in Fig. 19. In this manner shoulder portions or projections 111 are provided on the armature and cooperate with the flux from the field poles to position the armature definitely for each step thereof.

Fig. 21 shows still another of the numerous forms of armatures which may be employed in connection with the repeater motor for insuring definite steps. In this figure the armature 112, mounted on shaft 107', is provided on opposite end faces with projections 113. It will be noted that armature 112 may act in a similar manner to armature 103, since shoulders 114 may be arranged to cooperate with the magnetic flux in a manner similar to the shoulders provided by projections 103', 103" and the end tips of armature 112 may cooperate with the flux in the same manner as tips 104, 104' of armature 103.

Transmitter shaft 30 may be rotated in any suitable manner. In Fig. 6 I have shown a handle 59 secured to said shaft for rotating the same. It will, furthermore, be obvious that my transmitter may be used in connection with various devices for transmitting angular positions thereof. Thus in Fig. 12 I have shown a sighting instrument 63 rotatably mounted about a vertical pivot 64 and connected with a gear wheel 65 which meshes with a smaller gear 66 secured to transmitter shaft 30. By employing reduction gearing between the transmitter shaft and the sighting instrument, it will be evident that very small angular movements of said instrument may be transmitted depending on the gear ratio employed.

As shown in Fig. 3, the movements of repeater armature 3 and shaft 7 may be utilized to drive an indicator, such as a rotatable dial 67 with which cooperates a stationary pointer 68. Reduction gearing 69, 69' may be employed between armature shaft 7 and the shaft of dial 67 to impart small movements to said dial as compared with the movements of the armature 3. Said dial 69 and associated parts may be carried by a suitable supporting member 70, as shown, which may be carried by the repeater motor casing.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent, is:

1. In combination with a multi-pole repeater having a rotatable armature, means for so varying the action of said poles on said armature as to move the latter during one revolution through four times as many steps as there are poles, means including a shoulder movable with said armature for preventing the latter from assuming more than one position for each step, and means in the motor circuit for imparting an impulse to said armature when the circuit through said motor is broken.

2. In combination, a transmitter, a step-by-step repeater motor having a movable element actuated thereby, and means other than said armature for moving said element through a portion of a step whenever the circuit through said transmitter and said motor is broken.

In testimony whereof I have affixed my signature.

ELMER A. SPERRY, Jr.